United States Patent [19]
Fujimori et al.

[11] Patent Number: 5,870,162
[45] Date of Patent: Feb. 9, 1999

[54] LIQUID CRYSTAL DISPLAY DEVICE AND A METHOD OF FABRICATING THE DEVICE USING TRANSPARENT-ELECTRODES AS A PHOTOMASK

[75] Inventors: Koichi Fujimori, Nabari; Tokihiko Shinomiya, Nara, both of Japan

[73] Assignee: Sharp Kabushiki Kaisha, Osaka, Japan

[21] Appl. No.: 726,361

[22] Filed: Oct. 4, 1996

Related U.S. Application Data

[62] Division of Ser. No. 388,812, Feb. 15, 1995, Pat. No. 5,594,566.

[30] Foreign Application Priority Data

Feb. 23, 1994 [JP] Japan .................................... 6-25485
Jan. 23, 1995 [JP] Japan .................................... 7-8468

[51] Int. Cl.$^6$ .......................................... G02F 1/1343
[52] U.S. Cl. ............................................... 349/143
[58] Field of Search ................................. 349/143

[56] References Cited

U.S. PATENT DOCUMENTS

| | | |
|---|---|---|
| 4,596,445 | 6/1986 | Fergason . |
| 4,662,720 | 5/1987 | Fergason . |
| 5,333,074 | 7/1994 | Hikmet . |
| 5,357,356 | 10/1994 | Konuma . |

FOREIGN PATENT DOCUMENTS

| | | |
|---|---|---|
| 0-568-355 | 11/1993 | European Pat. Off. . |
| 56-140321 | 11/1981 | Japan . |
| 58-501631 | 9/1983 | Japan . |
| 59-226322 | 12/1984 | Japan . |
| 61-502128 | 9/1986 | Japan . |
| 1-269922 | 10/1989 | Japan . |
| 2-099920 | 4/1990 | Japan . |
| 2-153318 | 6/1990 | Japan . |
| 2-153319 | 6/1990 | Japan . |
| 3-046621 | 2/1991 | Japan . |
| 3-05915 | 3/1991 | Japan . |
| 3-061925 | 3/1991 | Japan . |
| 3-072317 | 3/1991 | Japan . |
| 3-278024 | 12/1991 | Japan . |
| 4-031823 | 2/1992 | Japan . |
| 4-031824 | 2/1992 | Japan . |
| 4-212928 | 8/1992 | Japan . |
| 4-338923 | 11/1992 | Japan . |
| 5-011237 | 1/1993 | Japan . |
| 5-027242 | 2/1993 | Japan . |
| 5-257135 | 10/1993 | Japan . |
| 5-281519 | 10/1993 | Japan . |
| 83/01016 | 3/1983 | WIPO . |
| 85/04262 | 9/1985 | WIPO . |

OTHER PUBLICATIONS

Chemistry and Chemical Industry, vol. 44, No. 4, 1991, pp. 112–113 (w/translation).

H. Yoshida et al., Japan Display '92, Oct. 1992, pp. 631–634.

H. Yamanaka et al., Japan Display '92, May 1992, pp. 789–792.

*Primary Examiner*—William L. Sikes
*Assistant Examiner*—James A. Dudek
*Attorney, Agent, or Firm*—Birch, Stewart, Kolasch & Birch, LLP

[57] ABSTRACT

Disclosed is a liquid crystal display device which includes a pair of substrates interposing a display medium including a polymer and liquid crystal therebetween and transparent-electrode portions formed on at least one of the pair of substrates, the transparent-electrode portions not easily transmitting light within a certain wavelength range.

13 Claims, 11 Drawing Sheets

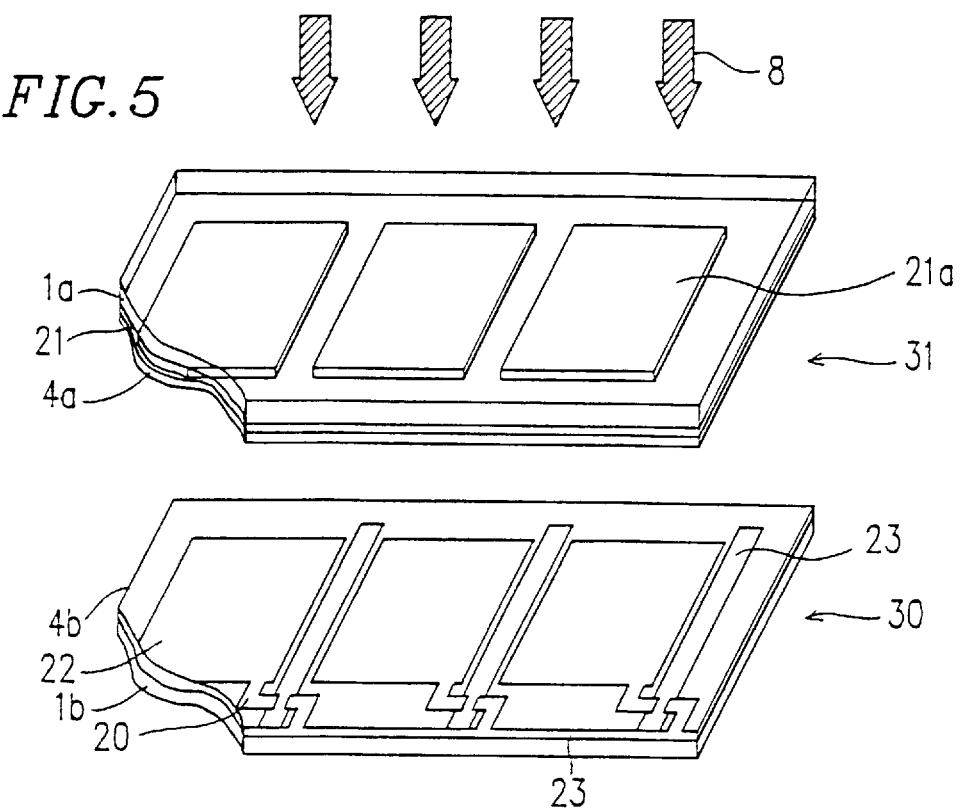

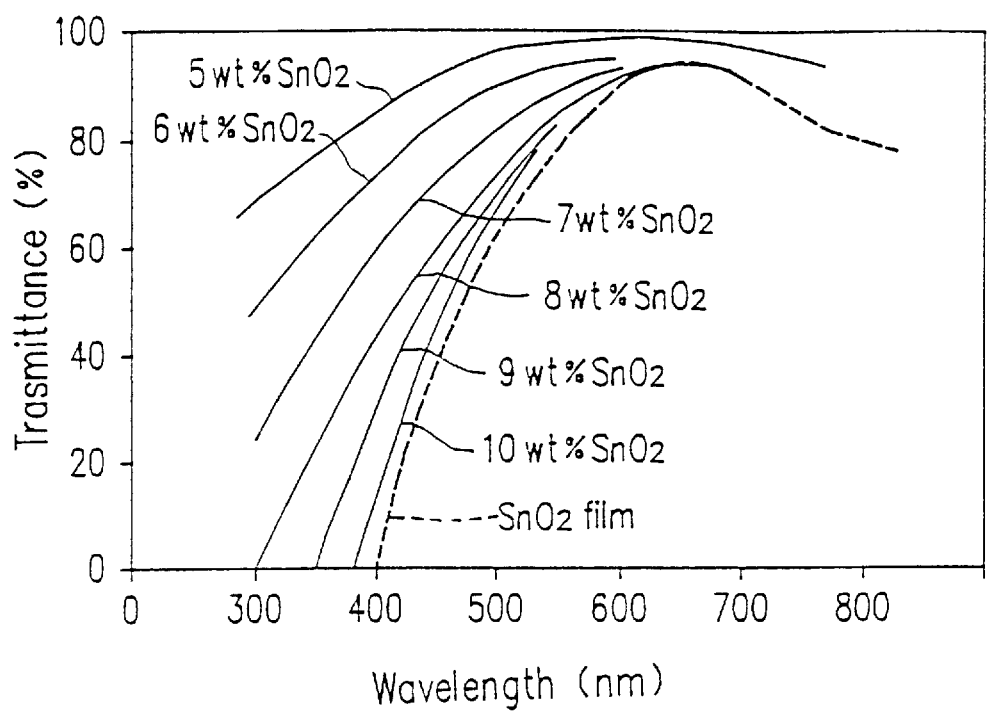

LIQUID CRYSTAL DISPLAY DEVICE AND A METHOD OF FABRICATING THE DEVICE USING TRANSPARENT-ELECTRODES AS A PHOTOMASK

This application is a divisional of application Ser. No. 08/388,812, filed on Feb. 15, 1995 now U.S. Pat. No. 5,899,566, the entire contents of which are hereby incorporated by reference.

BACKGROUND OF THE INVENTION

1. Field of the Invention

The present invention relates to a liquid crystal display (LCD) device and a method for fabricating the same. More specifically, the present invention relates to an LCD device including liquid crystal droplets isolated from one another by polymer walls, operated in a twisted nematic (TN) mode, a super-twisted nematic (STN) mode, an electrically controlled birefringence (ECB) mode, a ferroelectric liquid crystal (FLC) mode, a light scattering mode, and the like, and a method for fabricating the same.

2. Description of the Related Art

Various display modes have been employed for LCD devices presently available. For LCD devices utilizing electro-optical effects, for example, the TN mode and the STN mode using nematic liquid crystal have been realized. In recent years, LCD devices using FLC have reached the level of practical use.

A new mode of LCD device where the birefringence of liquid crystal is used to electrically control the transparent or white opaque state of liquid crystal has been proposed. In this mode, the ordinary refractive index of liquid crystal (LC) molecules and the refractive index of a polymer as a display medium are matched to each other, in principle. The transparent state is displayed when a voltage is applied to liquid crystal, aligning the liquid crystal in the direction of the electric field. The white opaque state, i.e., a light scattering state, is displayed when a voltage is not applied to liquid crystal, causing disorderly orientation of the liquid crystal. The following five fabrication methods have been proposed for this mode of LCD devices:

(1) A method where liquid crystal is encapsulated in a polymer capsule to provide a display medium (Japanese National Publication No. 58-501631)

(2) A method where photocurable or thermosetting resin and liquid crystal are mixed together. The liquid crystal is separated from the resin by curing the resin to form a liquid crystal region in the resin (Japanese National Publication No. 61-502128)

(3) A method where the diameter of a droplet-like liquid crystal region is controlled (Japanese Laid-Open Patent Publication No. 3-72317)

(4) A method where liquid crystal is put in holes of a porous polymer film (Japanese Laid-Open Patent Publication No. 3-59515)

(5) A method where polymer beads as a light scattering source are floated in liquid crystal confined between two transparent-electrodes facing each other. (Japanese Laid-Open Patent Publication No. 3-46621)

However, the above methods have respective disadvantages as follows.

In method (1), the encapsulated liquid crystal constitutes an independent liquid crystal (LC) droplet. Accordingly, a driving voltage for changing the orientation of liquid crystal molecules is required for each LC droplet, resulting in increasing the driving voltage required for operating all such LC droplets simultaneously as a whole. This limits the applications of the resultant LCD device.

Methods (2) and (3) utilize phase separation. Accordingly, it is difficult to locate the LC droplets at precise two-dimensional positions in method (2), and it is difficult to control the diameter of the LC droplets precisely in method (3).

Since method (4) does not utilize phase separation at the formation of LC droplets, it is advantageous in that the range of applicable resin materials and liquid crystal materials is significantly large, and that the porous polymer film can be sufficiently purified. At present, however, this method has disadvantages as follows: The diameter of the LC droplets can not be satisfactorily controlled; and the positions of the LC droplets along a substrate surface cannot be precisely controlled.

Method (5) provides great light scattering capability. However, this method has a disadvantage as follows: It is difficult to uniformly disperse beads and thus obtain the same degree of scattering for all pixels, resulting in a nonuniform display.

As described above, in the LCD devices using polymer dispersed liquid crystals where LC droplets are dispersed in a polymer matrix, the shape of the LC droplets is not uniform, and the precise arrangement of the LC droplets along the substrate surface is difficult to achieve due to the limitation in the fabrication methods. Because of this failure to precisely arrange the LC droplets, different driving voltages are required for the respective LC droplets. This results in losing sharpness at the threshold in the electro-optic characteristic and relatively increasing the driving voltage. Further, since a number of LC droplets which scatter less light are present, the contrast of the resultant LCD device is relatively low. Moreover, since the shape of the LC droplets is not uniform and the precise arrangement of the LC droplets along the substrate surface is difficult to obtain, as described above, a large screen with high precision is not possible. In the case where the LCD device is driven by a duty driving method using an average value obtained by turning on and off a signal, increasing the duty ratio is not possible.

In order to overcome the above problems, Japanese Patent Application No. 5-30996 assigned to the assignee of this application proposed an LCD device 400 as shown in FIGS. 12 and 13. Referring to FIG. 12, a mixture 113 of liquid crystal material, photocurable resin, and a photopolymerization initiator is injected into a space between a pair of substrates 101a and 101b facing each other. A photomask 114 having light shading portions 110 and light transmitting portions 111 is put over the substrate 101a so that the light shading portions 110 cover pixel portions. Then, ultraviolet (UV) light 108 is emitted from the side of the photomask 114 to irradiate the mixture 113. By this irradiation, as shown in FIG. 13, the LC molecules aggregate in the pixel portions corresponding to weak light irradiation regions to form liquid crystal (LC) regions 106 in a display medium layer, while the polymers aggregates in the portions other than the pixel portions corresponding to strong light irradiation regions to form polymer walls 107 in the display medium layer. In this proposed LCD device 400, since the pixel portions are shaded from light by the photomask, it is possible to form the LC regions 106 in the pixel portions.

However, the LCD device 400 having the LC regions in the pixel portions still has the following problem: At the time of light irradiation, an optical pass difference arises between the photomask and the polymer wall formation portions by the thickness of the substrate 101a. In other words, unless the light incident to the substrate 101a is parallel, the resultant polymer walls may differ from the intended shape thereof. The polymer walls may be wider than the pattern of the photomask by light scattering, or the polymer and the liquid crystal may not be distinctly phase-separated. This lowers the display quality of the resultant LCD device.

SUMMARY OF THE INVENTION

The liquid crystal display device of the present invention includes a pair of substrates interposing a display medium including a polymer and liquid crystal therebetween and transparent-electrode portions formed on at least one of the pair of substrates, the transparent-electrode portions not easily transmitting light within a certain wavelength range.

In one embodiment of the invention, the transparent-electrode portions are formed on both the pair of substrates in a shape of strips, the pair of substrates are placed to face each other such that the strip-shaped transparent-electrode portions on the pair of substrates intersect each other, and crossings of the transparent-electrode portions constitute pixels.

In another embodiment of the invention, the transparent-electrode portions are formed on both the pair of substrates, the transparent-electrode portions on one of the pair of substrates constitute pixel electrodes arranged in a matrix, while the transparent-electrode portions on the other substrate include thickened portions facing the pixel electrodes and thinned portions, and portions corresponding to the pixel electrodes constitute pixels.

In still another embodiment of the invention, the at least one of the pair of substrates is transparent, and the light transmittance for light with a wavelength of 400 nm or less of the transparent-electrode portions is 60% or less than that of the at least one of the pair of substrates.

In still another embodiment of the invention, the transparent-electrode portions include ITO films.

In still another embodiment of the invention, the ITO films contain 7 wt % or more of tin oxide.

In still another embodiment: of the invention, the transparent-electrode portions include antimony-doped tin oxide films.

In still another embodiment of the invention, the antimony-doped tin oxide films have a thickness of 100 nm or more.

In still another embodiment of the invention, alignment films are formed on a surface of at least one of the pair of electrodes facing the display medium.

In still another embodiment of the invention, the transparent-electrode portions include zinc oxide films.

In still another embodiment of the invention, the display medium includes liquid crystal regions formed corresponding to the pixels and polymer walls surrounding the liquid crystal regions.

The method for fabricating a liquid crystal display device of the invention includes the steps of:
  forming strip-shaped transparent-electrodes on two substrates at least one of which is transparent, the transparent-electrodes not easily transmitting light within a certain wavelength range;
  attaching the two substrates to face each other such that the transparent-electrodes on the two substrates intersect each other;
  injecting a mixture of at least liquid crystal material and photocurable resin into a space between the attached two substrates; and
  irradiating the mixture with light from at least one side of the attached two substrates.

According to another aspect of the invention, the method for fabricating a liquid crystal display device includes the steps of:
  forming first transparent-electrodes constituting pixel electrodes in a matrix on a first substrate of two substrates at least a second substrate of which is transparent, and forming second transparent-electrodes not easily transmitting light within a certain wavelength range, the second transparent-electrodes including thickened portions of a pattern corresponding to and facing the pixel electrodes and thinned portions;
  attaching the two substrates to face each other such that the first transparent-electrodes and the thickened portions intersect each other;
  injecting a mixture of at least liquid crystal material and photocurable resin into a space between the attached two substrates; and
  irradiating the mixture with light from the side of the second substrate.

In one embodiment of the invention, the transparent-electrodes are formed of ITO films and 2 sccm or less of oxygen is fed into an reaction apparatus such that the transparent-electrodes contain oxygen.

In still another embodiment of the invention, the method further includes the step of forming zinc oxide films on at least top or bottom surface of the transparent-electrodes.

According to the present invention, transparent-electrode portions which do not easily transmit light within a certain wavelength range are formed on at least one of a pair of substrates. When light within this wavelength range is emitted from the outside of the transparent-electrode portions, light passing through the transparent-electrode portion is reduced or shaded. In other words, in the LCD device according to the present invention, the transparent-electrode portions work as a photomask reducing or shading light.

Thus, a mixture containing at least liquid crystal material and photocurable material, which is a display medium operable by light irradiation, is confined between the pair of substrates. When light with a wavelength of 400 nm or less, for example, is emitted from the side of the substrate having the above light-reducing or shading means, the light passes through the portions where the above means are not formed and irradiates the regions of the mixture underneath the portions. The photocurable material contained in the mixture starts polymerization in these regions. As a result, polymer material is mainly present in these strong light irradiation regions, while the LC molecules are present in the remaining weak light irradiation regions corresponding to the portions where the above means are formed. Thus, the LC regions and the polymer regions can be selectively formed. Consequently, a display medium having LC regions in the portions corresponding to the transparent-electrode portions and polymer walls in the other portions is formed.

The light-reducing or shading means transmit light with a wavelength of more than 400 nm which is used for the display. Therefore, the resultant LCD device having such means provides no obstacle to actual display.

Thus, the invention described herein makes possible the advantages of providing an LCD device including a display medium having LC regions precisely corresponding to the profiles of pixels formed without using a photomask placed outside an liquid crystal cell, and providing a method for fabricating the same.

These and other advantages of the present invention will become apparent to those skilled in the art upon reading and understanding the following detailed description with reference to the accompanying figures.

BRIEF DESCRIPTION OF THE DRAWINGS

FIG. 2A shows how light irradiation is conducted, and FIG. 2B shows a status of the LCD device after the irradiation.

FIG. 5 is a perspective view of the LCD device of FIG. 4 illustrating a status in the fabrication process.

FIG. 7 is a graph showing the relationship among percentage of tin oxide, wavelength, and light transmittance.

DESCRIPTION OF THE PREFERRED EMBODIMENTS

The present invention will be described by way of examples, though not limited thereto, with reference to the accompanying drawings.

(EXAMPLE 1)

Figure 1:
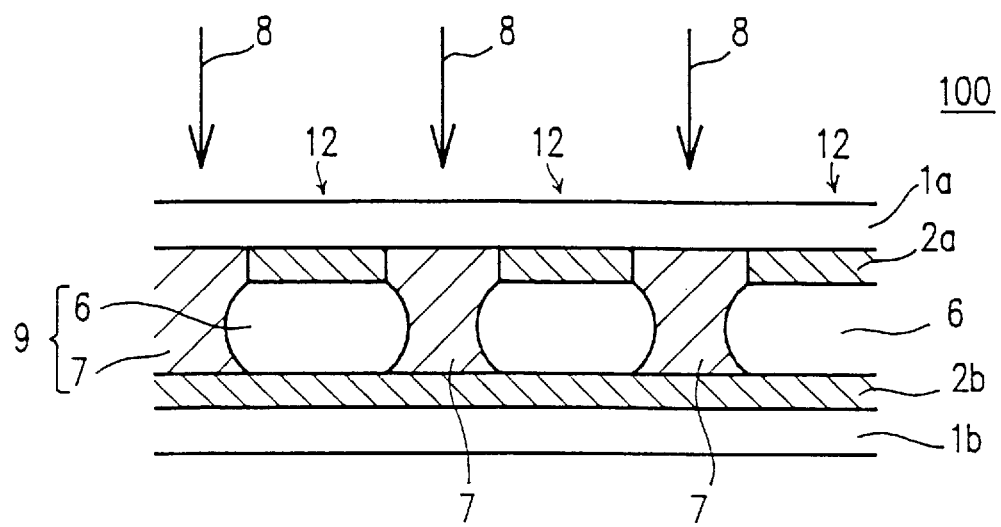
FIG. 1 is a sectional view of an LCD device of the first example according to the present invention.

FIG. 1 is a sectional view of a simple matrix type LCD device 100 of the first example according to the present invention. The LCD device 100 includes a pair of substrates 1a and 1b facing each other and a display medium layer 9 interposed therebetween. The display medium layer 9 has liquid crystal (LC) regions 6 at positions corresponding to pixels 12 and polymer walls 7 surrounding the LC regions 6.

A plurality of strip-shaped transparent electrodes 2a and 2b made of ITO are formed on the surfaces of the pair of substrates 1a and 1b facing the display medium layer 9, respectively. The transparent electrodes 2a on the substrate 1a and the transparent electrodes 2b on the substrate 1b intersect each other. In the illustrated example, they intersect at right angles.

Electrical insulating films and alignment films (both not shown) are formed between the transparent electrode 2a and the display medium layer 9 and between the transparent electrode 2b and the display medium layer 9 with the alignment films being in contact with the display medium layer 9.

A method for fabricating the simple matrix type LCD device 100 with the above structure will be described.

The strip-shaped transparent electrodes 2a are formed on one surface of the substrate 1a, and the strip-shaped transparent electrodes 2b are formed on one surface of the substrate 1b. The transparent electrodes 2a and 2b are formed by sputtering, for example, to have a width of 280 $\mu$m and a thickness of 200 nm at intervals of 20 $\mu$m. The light transmittance of the portions of the substrates 1a and 1b having the transparent electrodes 2a and 2b thereon (hereinafter, referred to as transparent-electrode portions) is 40% that of the portions of the substrates 1a and 1b without the transparent electrodes 2a and 2b (hereinafter, referred to as non-transparent-electrode portions).

The electrical insulating films are formed to cover the transparent electrodes 2a and 2b by depositing $SiO_2$ by sputtering, for example. The thickness of the electrical insulating films is 50 nm to 300 nm, for example, preferably 70 nm to 100 nm.

The alignment films are formed of an organic material such as polyimide on the electrical insulating films. The thickness of the alignment films is 30 nm to 200 nm, preferably 50 nm to 100 nm. The alignment films are then rubbed with nylon cloth and the like.

Figure 2A:
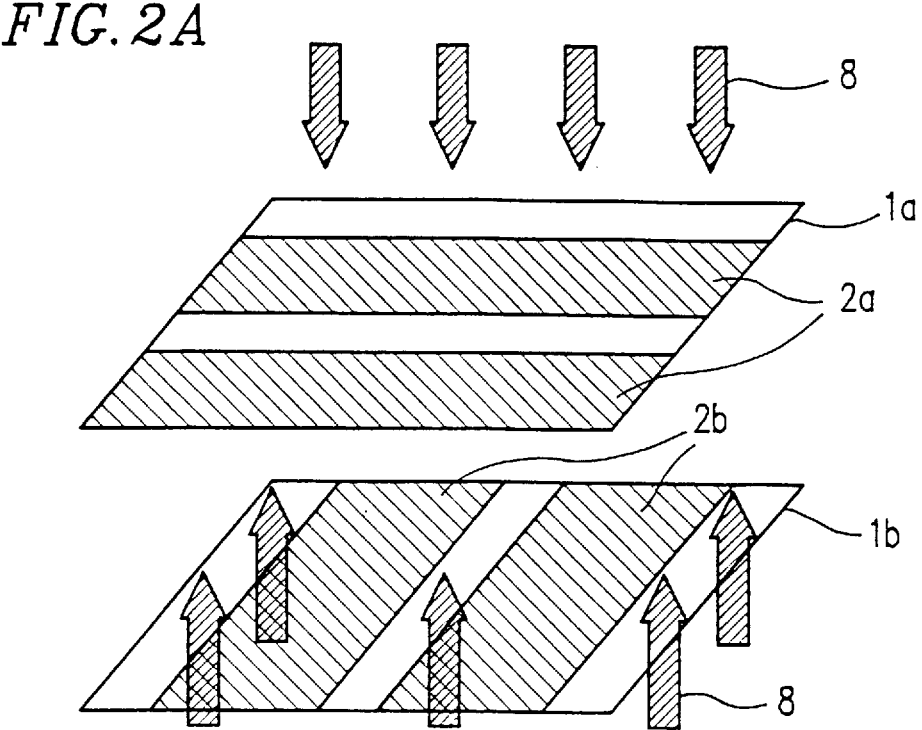
FIGS. 2A and 2B are perspective views illustrating the fabrication process of the LCD device of FIG. 1, where

As shown in FIG. 2A, the thus-formed pair of substrates 1a and 1b are placed facing each other so that the strip-shaped transparent electrodes 2a and 2b intersect each other at right angles. The substrates 1a and 1b are attached together with spacers interposed therebetween. The space between the substrates 1a and 1b is sealed by surrounding the periphery thereof with an epoxy sealant, for example. An opening is formed through the sealant wall as an injection port. The transparent electrodes 2a and 2b may not necessarily be at strictly right angles, but just intersect each other.

Thereafter, a mixture of liquid crystal material, photocurable resin, and a photopolymerization initiator is injected into the space between the substrates 1a and 1b. As for the mixture used in this example, a mixture of 4 g of ZLI-4792 (Merck & Co.) as the liquid crystal material added with 0.3% of a chiral agent (S-811), 0.1 g of R-684 (Nippon Kayaku), 0.07 g of p-phenylstyrene, 0.8 g of isobornylmethacrylate, and 0.1 g of perfluoromethacrylate as the photocurable resin, and 0.003 g of Irugacure 651 (Ciba-Geigy) as the photopolymerization initiator was used. The mixture was injected under a temperature of about 30° C. The photopolymerization initiator may be omitted.

As shown in FIG. 2A, light 8 with a wavelength of 400 nm or less is emitted from the outside of the substrates 1a and 1b to irradiate the mixture. As the light source, a high-pressure mercury lamp for ultraviolet (UV) irradiation which can emit collimated light is used, for example. The mixture was positioned below the high-pressure mercury lamp so as to be irradiated with UV light at 10 mW/cm$^2$ (wavelength: 365 nm). Light was emitted both from the side of the substrate 1a and the side of the substrate 1b simultaneously for five minutes. Alternatively, the irradiation may be conducted first from the side of one substrate and then from the other side, or may be conducted only from one side. In the latter case, long LC regions, each corresponding to a plurality of pixels in a row, are formed in the shape of stripes. A temperature range where the liquid crystal between the substrates 1a and 1b is in a liquid phase may be used.

By the irradiation as described above, the LC regions 6 are formed in the portions between the substrates 1a and 1b corresponding to the crossings of the transparent electrodes 2a and 2b, i.e., the pixel portions, while the polymer walls 7 are formed in the other portions, surrounding the LC regions 6. The LC cell is thus formed. The phrase "surrounding the LC regions" as used herein also includes the status where the LC regions are not completely surrounded, i.e., a portion of the LC region is not covered with the polymer walls 7.

When the irradiation is conducted under a high temperature for stabilizing the orientation of LC, this high temperature must be lowered to room temperature in a slow cooling oven. The cooling rate is 3° C./h to 20° C./h, preferably 5° C./h to 10° C./h. In addition, after the formation of the polymer walls 7, short-time UV irradiation with weak illuminance may be conducted if required, for curing any remainders of the photocurable resin and for further ensuring the crosslinking of the polymers.

Other photocurable resin may be used for the polymer walls 7. The injection port is sealed with a commercially available UV-curable resin. The UV irradiation for curing the UV-curable resin should be conducted so that the display portion of the substrate would not be irradiated with light.

Polarizers are then attached to the both surfaces of the thus-produced LC cell, to complete the TN type LCD device.

The LCD device thus fabricated was observed by a microscope. It was confirmed that the LC regions 6 where LC molecules had aggregated had been formed in the pixel portions, and no polymer material is left at the interfaces of the LC regions 6 and the alignment films, providing good orientation of LC. It was also confirmed that the polymer walls 7 had been formed without liquid crystal contained therein, and that the LC regions 6 having substantially the same shape and area as those of the crossings of the transparent electrodes 2a and 2b had been formed without any intrusion of the polymer walls 7 into the pixel portions.

Table 1 shows the measurement results of the light transmittance of the substrates of the LCD device of this example. As is understood from Table 1, the light transmittance of the portions where the transparent electrodes are formed (transparent-electrode portions) is about 40% of that of the portions where the transparent electrodes are not formed (non-transparent-electrode portions). This indicates that the transparent electrodes sufficiently work as a photomask.

TABLE 1

| Light transmittance for light of 400 nm or less (%) | | | |
| --- | --- | --- | --- |
| Example 1 | | Example 2 | |
| Transparent electrode portion | Non-transparent electrode portion | Pixel portion (double-layer) | Non-pixel portion (single-layer) |
| 36 | 90 | 32 | 76 |

Figure 3A:
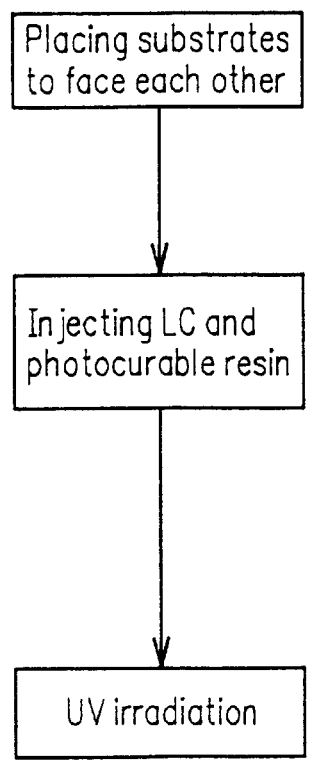
FIGS. 3A and 3B are flowcharts of the fabrication process of the LCD device according to the present invention and a known fabrication process using a photomask, respectively.
Figure 3B:
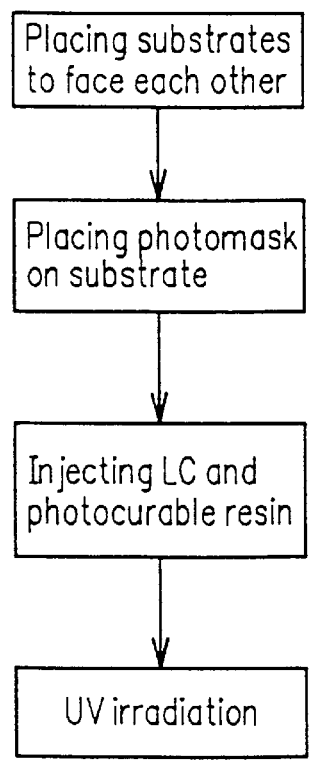

FIG. 3A is a flowchart showing the fabrication process according to the present invention. The LCD device of the present invention is fabricated by: placing a pair of substrates to face each other; injecting a mixture of liquid crystal material, photocurable resin, and the like into the space between the pair of substrate; and then exposing the pair of substrates with the mixture to UV irradiation. On the contrary, in a known method shown in FIG. 3B, an LCD device is fabricated by: placing a pair of substrates to face each other; injecting the mixture into the space between the pair of substrates before or after a photomask is put on a surface of the substrates; and exposing the pair of substrates with the mixture to UV irradiation. Thus, according to the present invention, the step of putting a photomask on the substrate can be omitted, thereby greatly simplifying the fabrication process. The method of the present invention is also advantageous in that, since the transparent electrodes working as the photomask against UV are incorporated in the LCD device, alignment of the photomask is unnecessary.

Color filters may be disposed on the LC cell, if required.

(EXAMPLE 2)

In Example 2, the present invention is applied to an active matrix type LCD device.

Figure 4:
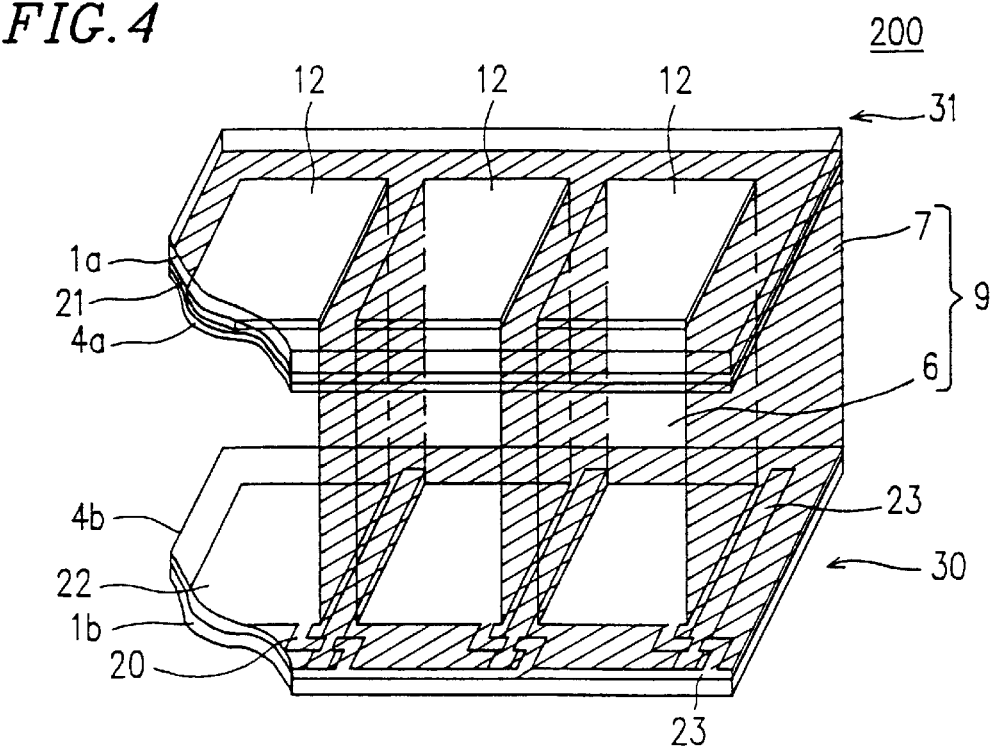
FIG. 4 is a perspective view of an LCD device of the second example according to the present invention.

FIG. 4 is a perspective view of an LCD device 200 of the second example. The LCD device 200 includes a TFT (thin film transistor) substrate 30 and a counter substrate 31 disposed to face each other. A display medium layer 9 having LC regions 6 and polymer walls 7 surrounding the LC regions 6 is interposed between the TFT substrate 30 and the counter substrate 31. The portions where the LC regions 6 are formed constitute a matrix of pixels 12.

The TFT substrate 30 includes a plurality of pixel electrodes 22 formed of ITO in the form of matrix on the surface of a glass substrate 1b facing the display medium layer 9. Bus lines 23 run along spaces between the adjacent pixel electrodes 22 in transverse and longitudinal directions. Those running in one direction are source bus lines and those running in the other direction are gate bus lines. In this example, the bus lines 23 also work as light shading films shading both visual light and UV light. The pixel electrodes 22 and sets of the transverse and longitudinal bus lines 23 are electrically connected or disconnected through corresponding TFTs 20. An alignment film 4b is formed over the glass substrate 1b covering the bus lines 23 and the TFTs 20, and is rubbed for an alignment treatment.

The counter substrate 31 includes a counter electrode 21 formed on the surface of a glass substrate 1a facing the display medium layer 9. The counter electrode 21 is a transparent-electrode which transmits less light of a certain wavelength range. The portions of the counter electrode 21 corresponding to pixels 12 are made thicker than the other portions thereof. In this example, a double-layer structure was adopted for such thickened portions. An alignment film 4a is formed on the surface of the counter electrode 21 facing the display medium layer 9, and is rubbed for an alignment treatment.

The method for fabricating the LCD device with the above structure will be described.

First, the pixel electrodes 22, the bus lines 23, the TFTs 20, and the alignment film 4b are formed on the glass substrate 1b so as to form the TFT substrate 30. The counter electrode 21 and the alignment film 4a are formed on the glass substrate 1a so as to form the counter substrate 31. The double-layer structure of the counter electrode 21 as mentioned above is fabricated in the following manner: A first layer is formed of ITO with a high transmittance by a high-frequency sputtering method to a thickness of 100 nm, for example. Then, a second layer is formed of ITO by a DC dipolar sputtering method, for example, at 80° C. to a thickness of 100 nm. The second ITO layer is etched by a photolithography technique to the pattern of the matrix of pixels 12. The measured results of the light transmittance of the thus-formed counter electrode 21 are shown in Table 1. As is understood from Table 1, the light (UV) transmittance of double-layer portions 21a of the counter electrode 21 (pixel portions) is about 42% of that of single-layer portions thereof (non-pixel portions).

The alignment films 4a and 4b of the TFT substrate 30 and the counter substrate 31, respectively, are rubbed appropriately.

As shown in FIG. 5, the TFT substrate 30 and the counter substrate 31 are disposed opposite to each other so that the pixel electrodes 22 and the second layers of the counter electrode 21 face each other. The two substrates 30 and 31 are then attached together with a space therebetween kept uniform by inserting spacers of a height of 6 μm therebetween. The space is sealed with an opening formed as an injection port.

Thereafter, a mixture of liquid crystal material, photocurable resin, and a photopolymerization initiator is injected into the space between the TFT substrate 30 and the counter substrate 31 through the injection port. As for the mixture of this example, a mixture of 4 g of ZLI-4792 (Merck & Co.) as the liquid crystal material added with 0.3% of a chiral agent (S-811), 0.1 g of R-684 (Nippon Kayaku), 0.07 g of p-phenylstyrene, 0.8 g of isobornylmethacrylate, and 0.1 g of perfluoromethacrylate as the photocurable resin, and 0.003 g of Irugacure 651 (Ciba-Geigy) as the photopolymerization initiator was used. The mixture was injected under vacuum at about 30° C.

Then, as shown in FIG. 5, the mixture injected into the pair of substrates 30 and 31 is irradiated with light 8 having a wavelength of 400 nm or less (i.e., UV). As the light source, a high-pressure mercury lamp for UV irradiation which can emit collimated light is used. The mixture was positioned below the high-pressure mercury lamp so as to be irradiated with UV light at 10 mW/cm$^2$ (wavelength: 365 nm). Light was emitted from the side of the counter substrate 31 for five minutes. A temperature range where the liquid crystal between the substrates is in a liquid phase may be used.

By the light irradiation as described above, light is shaded at the double-layer portions of the counter electrode 21 corresponding to the pixels 12. Accordingly, the LC regions 6 are formed in the portion of the display medium layer 9 corresponding to the light shaded portions, while the polymer walls 7 are formed in the regions of the display medium layer 9 corresponding to the light irradiation portions, surrounding the LC regions 6. When the irradiation is conducted under a high temperature for stabilizing the orientation of LC, this high temperature must be lowered to room temperature in a slow cooling oven. In addition, after the formation of the polymer walls 7, short-time UV irradiation with weak illuminance may be conducted, if required, for curing any remainders of the photocurable resin and for further ensuring the crosslinking of the polymers.

Polarizers are then attached to the both surfaces of the thus-produced liquid crystal cell, so as to complete the LCD device 200. Other types of photocurable resin may be used for the polymer walls 7. The injection port is sealed with a commercially available UV photocurable resin. At this time, the UV irradiation for curing the UV-curable resin should be conducted so that the display portion of the substrate would not be irradiated with UV light.

The LCD device 200 thus fabricated was observed by a microscope. It was confirmed that the liquid crystal material had gathered in the pixels 12 and had shown a well oriented state without polymer material being left at the interfaces of the liquid crystal and the alignment films 4a and 4b. It was also confirmed that the polymer walls 7 had been formed without liquid crystal contained therein, and that the LC regions 6 having substantially the same shape and area as those of the second ITO layers of the counter electrode 21 had been formed.

Color filters may be disposed on the LC cell, if required.

(EXAMPLE 3)

In this example, the case where an antimony-doped tin oxide film (hereinafter, referred to as an ATO film), instead of ITO used in Examples 1 and 2, will be described. The "ATO film" as used herein refers to a film having similar composition and properties to those of a so-called NESA film. "NESA" is a general trade designation of a product from PPG Industries Inc., U.S.A.

In this example, the LCD device 100 of FIG. 1 was fabricated using ATO films, instead of the ITO films, to form the transparent-electrodes. The ATO films are formed in the following manner: The glass substrate 1 was first heated to about 450° C., and a solution composed of deionized water, hydrochloric acid, tin tetrachloride, and antimony trichloride was sprayed onto the glass substrate 1 so as to form the strip-shaped transparent-electrodes with a thickness of about 150 nm as in Example 1.

The UV transmittance of the thus-formed transparent-electrode portions was 33%, while that of the non-transparent-electrode portions was 93%. That is, the UV transmittance of the former is about 36% of that of the latter. The wavelength used was 365 nm.

Thus, as in Example 1, the LC regions are formed at the crossings of the strip-shaped transparent-electrodes made of ATO films, while the polymer walls are formed surrounding the LC regions. The ATO films are also applicable to the active matrix type LCD device described in Example 2.

Hereinafter, the light transmittance of the transparent-electrodes which is the main portion of the present invention will be described.

The present invention uses the transparent-electrodes themselves as a photomask, not disposing a photomask on an outer surface of an LC cell as in the known techniques. In such transparent-electrodes that can also be used as a photomask, the transmittance for UV light (wavelength: 400 nm or less) should be 60% or less of the transmittance of non-transparent-electrode portions, preferably 50% or less, because of the reasons detailed below.

Figure 6A:
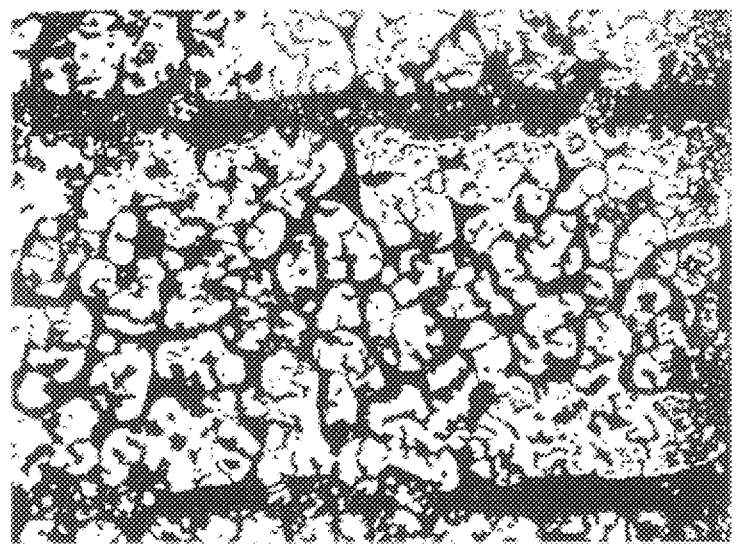
FIGS. 6A and 6B show the status of polymer walls and the phase separation between liquid crystal and polymer material in the case where the UV transmittance of the transparent-electrode portions is 70% of that of the non-transparent-electrode portions, and in the case where it is 48%, respectively.
Figure 6B:
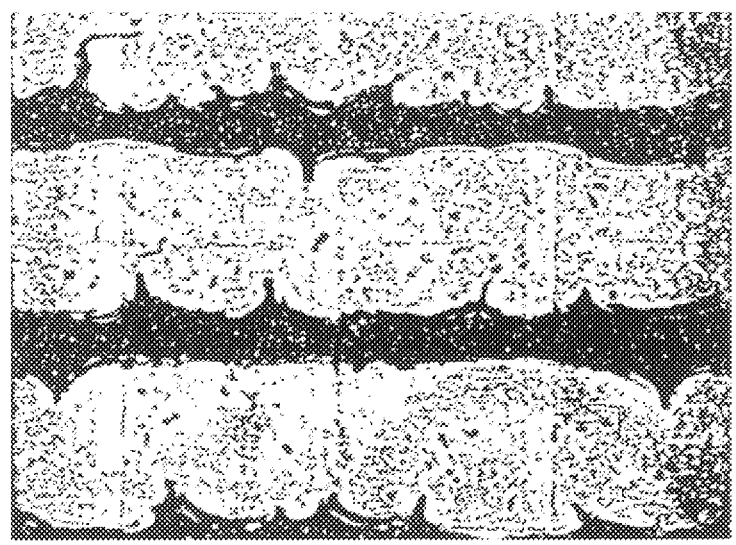

FIG. 6A shows the formation of polymer walls and the phase separation between liquid crystal and the polymer when the UV transmittance of the transparent-electrode portions is 70% of that of the non-transparent-electrode portions. FIG. 6B shows the formation of polymer walls and the phase separation between liquid crystal and the polymer when the UV transmittance of the transparent-electrode portions is 48% of that of the non-transparent-electrode portions.

As is understood from FIG. 6A, when the UV transmittance of the transparent-electrode portions is not sufficiently low, polymers remain in liquid crystal of the pixel portions (transparent-electrode portions). Also, LC molecules are found in the polymer walls which should be formed in the non-pixel portions (non-transparent-electrode portions). Thus, the polymer walls have not been formed corresponding to the matrix pattern of the pixels. On the contrary, in FIG. 6B, few polymers and LC molecules are found in the pixel portions and the non-pixel portions, respectively, forming distinctive boundaries between the LC regions and the polymer walls corresponding to the matrix pattern of the pixels.

The inventors have also studied the phase separation between the liquid crystal and the polymer material with respect to the ratio of the light transmittance of the transparent-electrode portions against that of the non-transparent-electrode portions (expressed by a percentage). As a result, at around 65%, the separation improves, though a small amount of polymers and LC molecules remain in the LC regions and the polymer walls, respectively. At around 50%, complete phase separation is realized, forming the polymer walls corresponding to the pattern of the shading means covering the pixel portions.

The methods for forming the transparent-electrodes according to the present invention will be described in detail for each type of the transparent-electrodes.

The case of using ITO (a mixture of indium oxide and tin oxide) as the material for the transparent-electrode will be first described. Indium metal or indium oxide may be used as a starting material. In the former case, reactive deposition, reactive sputtering, reactive ion plating, or the like may be used. In the latter case, vacuum deposition, high-frequency sputtering, plasma CVD (chemical vapor deposition), or the like may be used. In either case, the ITO film is formed under reduced pressure containing a slight amount of oxygen, and then sintered.

When the content of oxygen at the formation of the film is greater, the light transmittance of the resultant film improves. On the other hand, when the content of oxygen is smaller, the electric conductivity improves. Accordingly, the UV transmittance of the ITO film can be easily controlled by appropriately setting the amount of tin oxide and the content of oxygen at the film formation in the ITO film formation process.

Table 2 shows the relationship between the oxygen content at the film formation and the ratio of the transmittance for light with a wavelength of 400 nm or less. FIG. 7 shows the relationship among the amount of tin oxide, the wavelength, and the light transmittance.

As is understood from Table 2, in order to obtain a ratio of transmittance of 60% or less, it is preferable to feed oxygen into an reaction apparatus at about 2 sccm or less to allow the transparent-electrodes to take the oxygen. Also, as is understood from FIG. 7, in order to obtain a ratio of transmittance of 60% or less for light with a wavelength of 400 nm or less, the amount of $SnO_2$ is preferably about 7 wt % or more.

TABLE 2

| Oxygen content (sccm) | 8 | 4 | 2 | 1 | 0.5 | 0.25 | 0 |
|---|---|---|---|---|---|---|---|
| Light (~400 nm) Ratio of transmittance | 82 | 70 | 63 | 52 | 41 | 30 | 19 |

Figure 8:
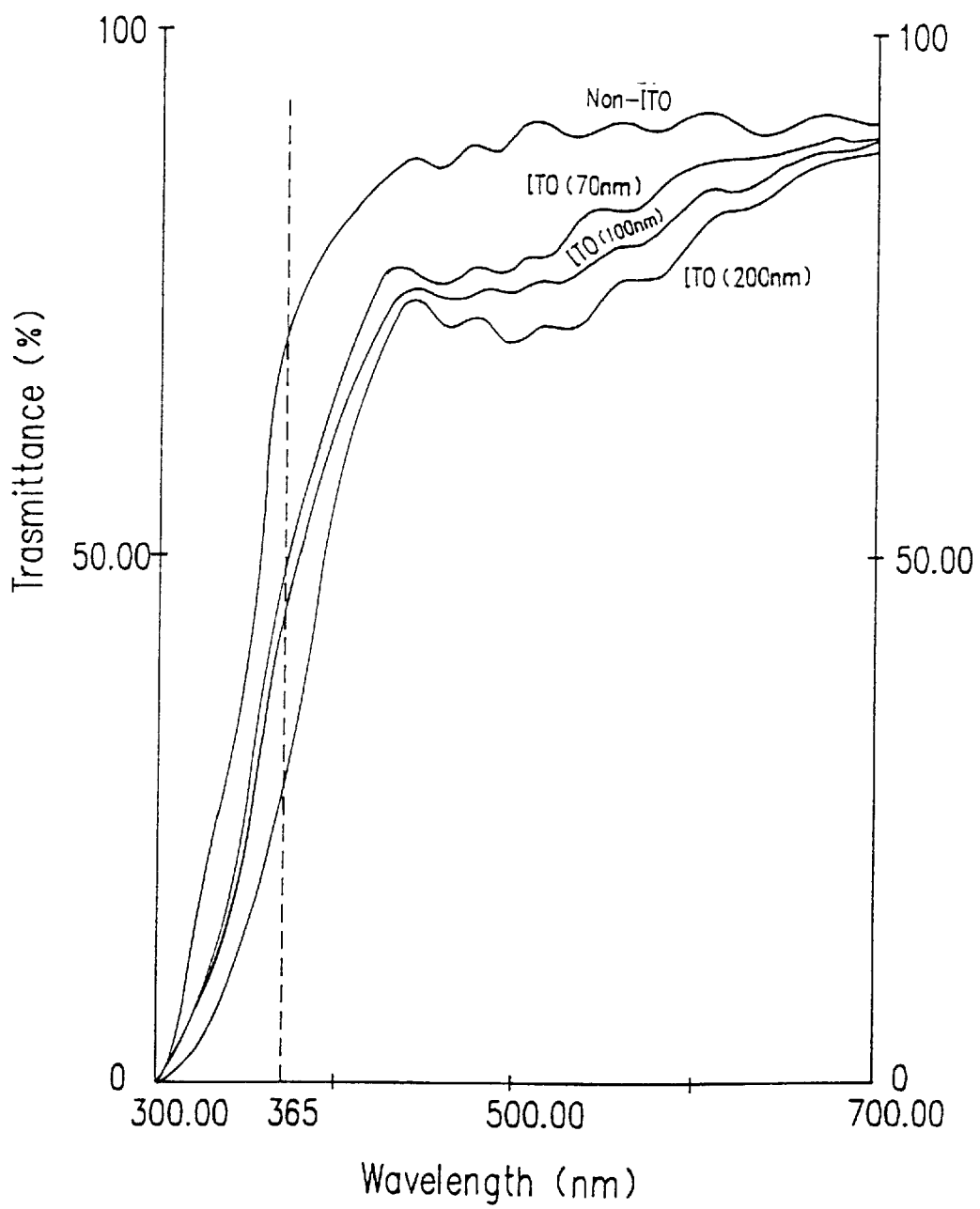
FIG. 8 is a graph showing the spectral characteristics of ITO electrodes formed by DC dipolar sputtering at 80° C.

The transmittance can also be controlled by changing the thickness of the ITO electrodes. FIG. 8 shows the spectral characteristics of ITO electrodes formed by a DC dipolar sputtering method at 80° C. The spectral characteristics of four cases where no ITO electrode is formed (substrate only), and where ITO electrodes with thicknesses of 70 nm, 100 nm, and 200 nm are formed are shown.

As is understood from FIG. 8, the transmittance for light with a wavelength of 365 nm is about 50% for the thickness of 70 nm, while it is 25% for the thickness of 200 nm. Since the transmittance of the substrate without an ITO film is 78%, the thickness of the ITO film required for obtaining the allowable ratio of transmittance is 100 nm or more, preferably 150 nm or more, though this may vary depending on the conditions for the formation of the ITO film.

Figure 9:
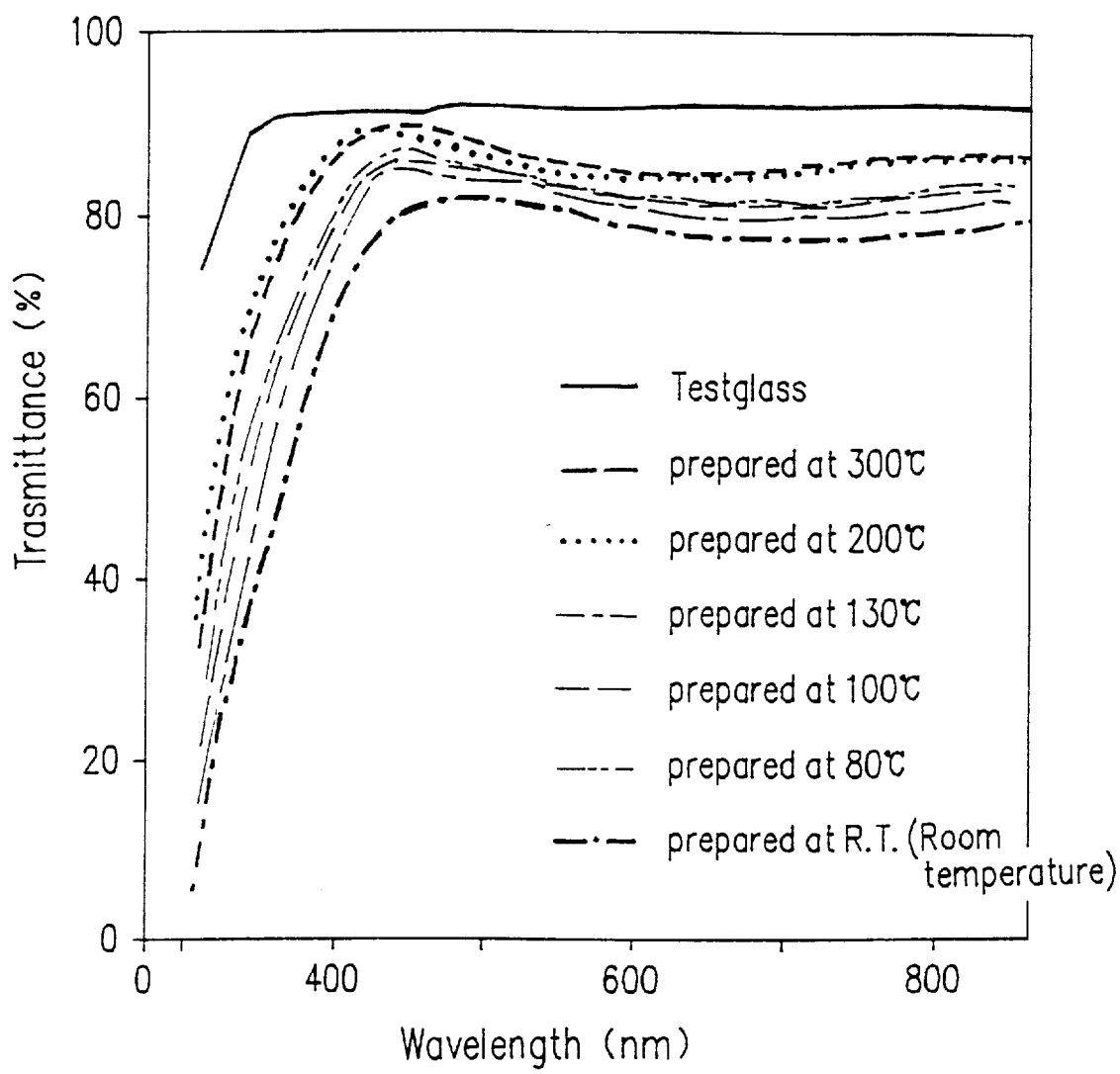
FIG. 9 is a graph showing the relationship between the film formation temperature by DC dipolar sputtering and the light transmittance.

The light transmittance may also be controlled by the temperature at sputtering. FIG. 9 shows the test results on the relationship between the temperature at the formation of an ITO film by the DC dipolar sputtering method and the light transmittance. The light transmittance (wavelength: 365 nm) was measured for films with the fixed thickness of 200 nm formed at five levels of temperature, i.e., 80° C., 100° C., 130° C., 200° C., and 300° C.

As is understood from FIG. 9, the light transmittance is 68% at 200° C., while it is 53% at 130° C. Since the light transmittance for a substrate without a film is 92%, the temperature at the film formation should be 150° C. or less, preferably 130° C. or less.

The respective parameters for controlling the UV transmittance have been so far described. In reality, however, a synergistic effect of the combination of these parameters is often used for controlling the transmittance of electrodes. For example, when the temperature at sputtering is 80° C. and the content of $SnO_2$ is 5 wt %, the ratio of transmittance can be suppressed to 60% or less though the thickness of the ITO film is as small as 70 nm. The above parameters also depend on the type of the LCD device to be fabricated. For example, in the case of a small LCD device, the thickness of electrodes is not so significantly important. It is rather required to lower the temperature at sputtering or increase the content of $SnO_2$.

Next, the case of using an ATO film will be described.

One method for forming an ATO film is as follows: A glass plate is first heated to about 450° to 500° C., and a solution composed of deionized water, hydrochloric acid, tin tetrachloride, and antimony trichloride is sprayed onto the glass plate. The ATO film may also be formed by evaporation. In the latter case, heat treatment at 500° to 550° C. after the evaporation is required. In general, the intrinsic resistance value of the resultant ATO film is slightly higher and the light transmittance thereof is slightly lower than those of the ITO film.

Figure 10:
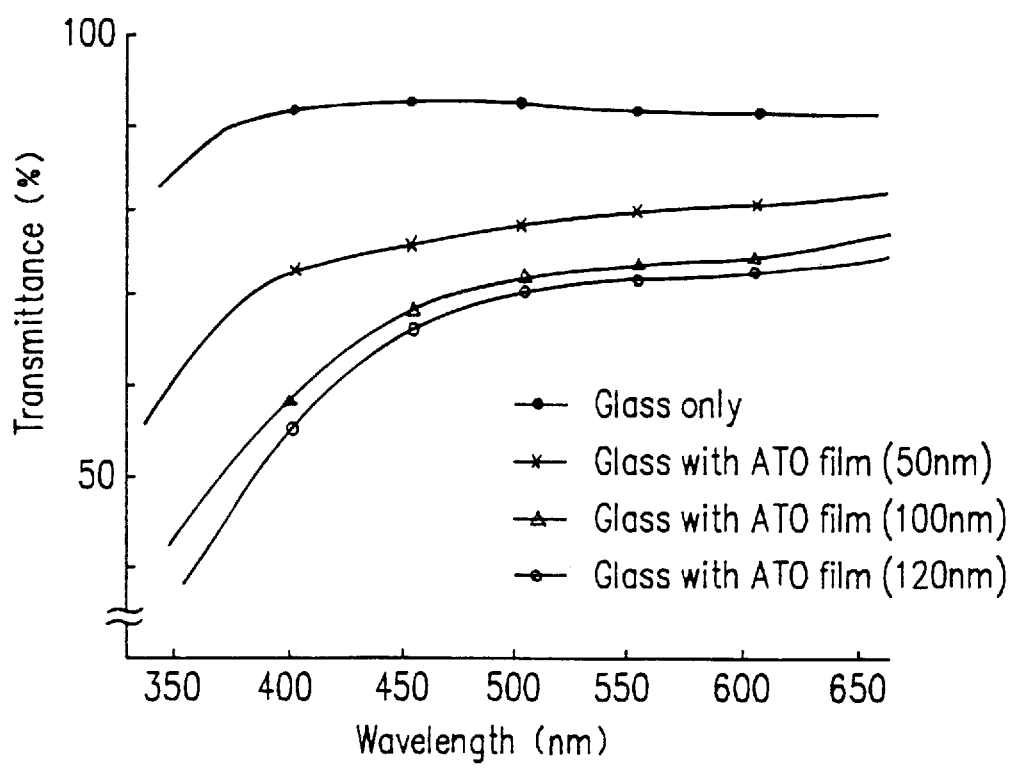
FIG. 10 is a graph showing the relationship between the wavelength (nm) and the light transmittance (%) of ATO films.

Accordingly, in order to lower the light transmittance (wavelength: 400 nm or less) of the ATO film, the thickness of the film should be increased. FIG. 10 shows this relationship with the light transmittance (%) as the vertical axis and the wavelength (nm) as the horizontal axis. The light transmittance for four cases of a glass substrate without a film, glass substrates with ATO films with thicknesses of 50 nm, 100 nm, and 120 nm were measured.

As is understood from FIG. 10, the light transmittance is 70% for the thickness of 50 nm, while it is 48% for the thickness of 100 nm. Since the light transmittance is 93% for the glass substrate without a film, a thickness of 100 nm or more, preferably 120 nm or more is required.

Thus, the ITO film and the ATO film used for the electrodes of the LCD devices were described. It has been observed that the light transmittance of the transparent-electrodes varies depending on the temperature at the film formation, the film thickness, and other conditions at the film formation (the oxygen content for the ITO film). The phase separation between the polymer and the liquid crystal is also dependent on these conditions, as is observed in FIGS. 6A and 6B. It has also been found that the ratio of the light transmittances (wavelength: 400 nm or less) of the transparent-electrode portions to that of the non-transparent-electrode portions is preferably 60% or less, more preferably 50% or less.

In the above examples, the alignment film is formed on the surface of each of the pair of substrates facing each other. The alignment film may be formed on only a surface of either one of the pair of substrates.

(EXAMPLE 4)

In the fourth example, the light transmittance is controlled by forming zinc oxide films on transparent-electrodes. In this example, the present invention is applied to an STN mode LCD device.

Figure 11:
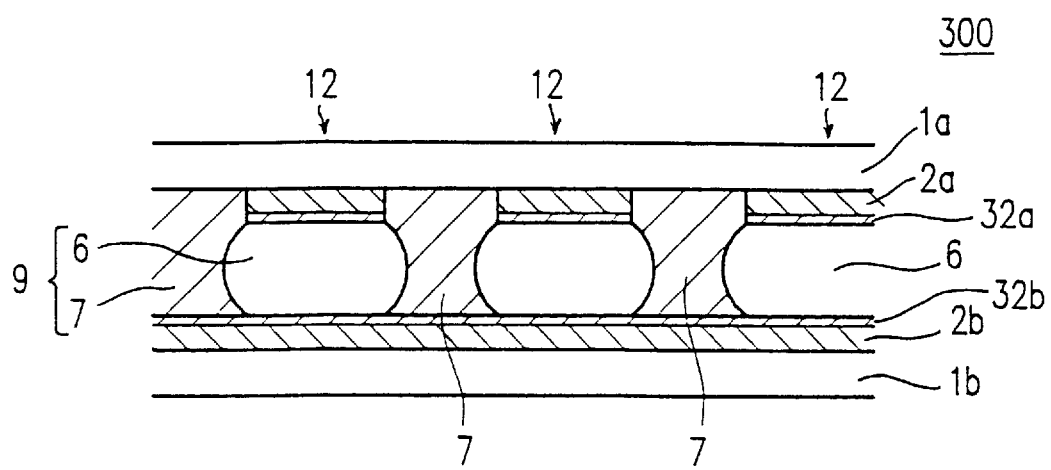
FIG. 11 is a sectional view of an LCD device of the fourth example according to the present invention.
Figure 12:
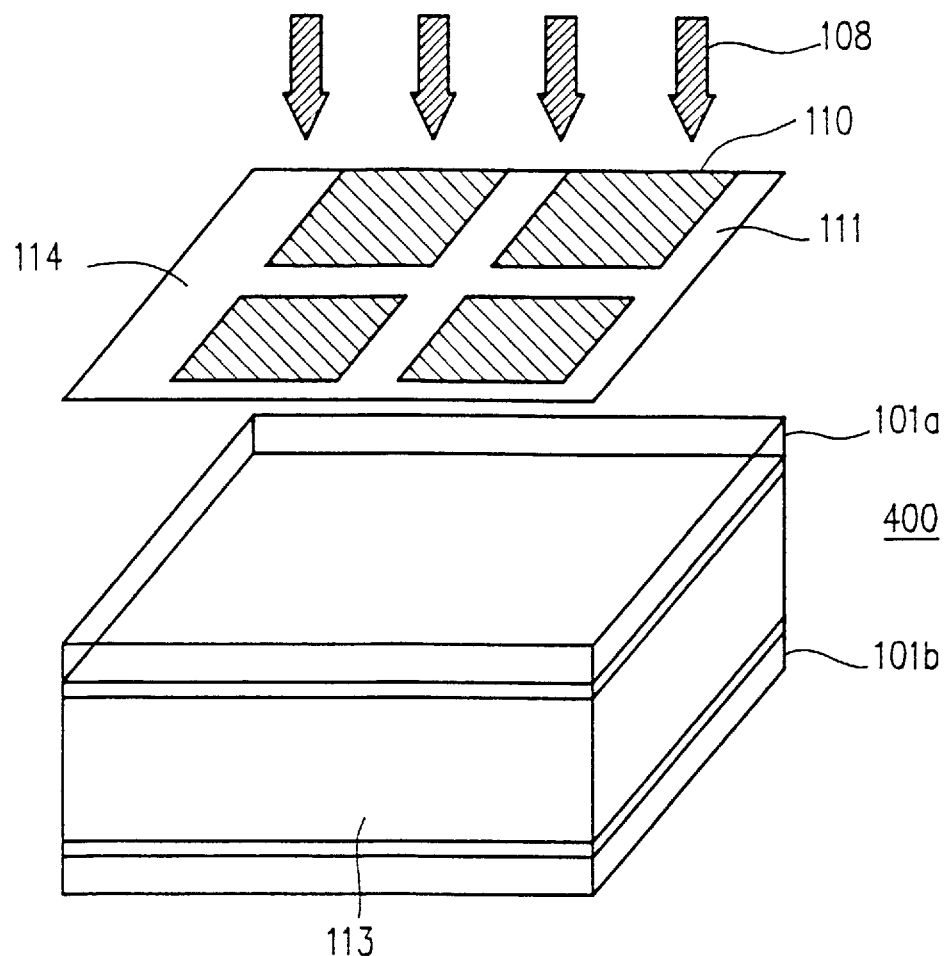
FIG. 12 is a perspective view illustrating light irradiation by a known method using a photomask.
Figure 13:
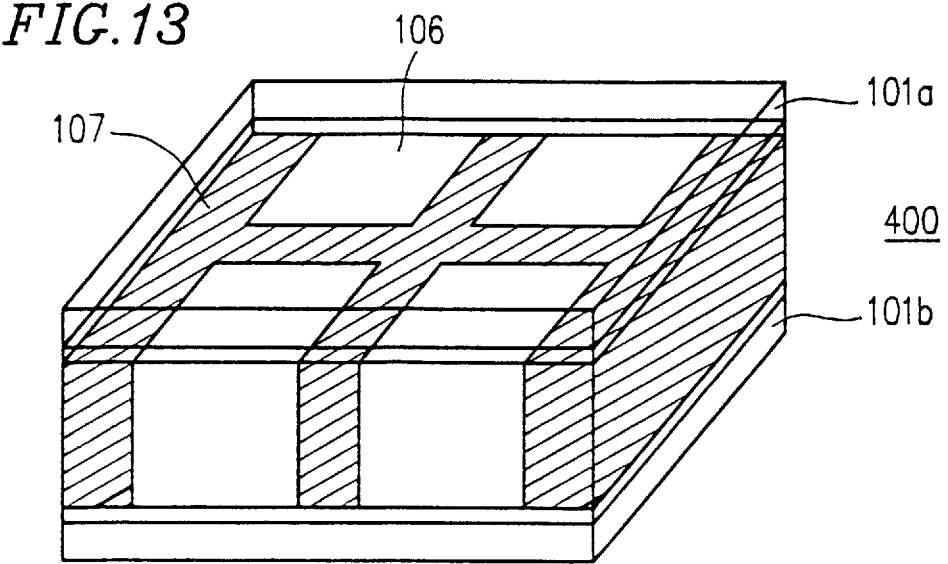
FIG. 13 is a perspective view of an LCD device fabricated by the known method.

FIG. 11 is a sectional view of an LCD device 300 of this example. The LCD device 300 includes a pair of substrate 1a and 1b opposing to each other and a display medium layer 9 interposed therebetween. A plurality of strip-shaped transparent-electrodes 2a and 2b are formed on the surfaces of the substrates 1a and 1b facing the display medium layer 9, respectively. The transparent-electrodes 2a on the substrate 1a and the transparent-electrodes 2b on the substrate 1b intersect each other. In the illustrated example, they intersect each other at right angles. However, they do not necessarily intersect at right angles. The crossings of the transparent-electrodes 2a and 2b correspond to pixels. Zinc oxide films 32a and 32b are formed on the transparent-electrodes 2a and 2b, respectively. The zinc oxide films 32a and 32b lowers the transmittance for light with a wavelength of 250 nm to 400 nm. Electrical insulating films and alignment films (both not shown) are formed on the zinc oxide films 32a and 32b. The display medium layer 9 has polymer walls 7 and LC regions 6 surrounded by the polymer walls 7. The orientation of LC molecules in the LC regions 6 is controlled by the alignment films. In the illustrated example, the LC molecules have a twist-orientation with 240°.

A method for fabricating the LCD device 300 will be described.

ITO was deposited on one surface of each of the substrates 1a and 1b by a sputtering method so as to form ITO films having a width of 280 μm and a thickness of 200 nm at intervals of 20 μm. Thus, the transparent-electrodes 2a and 3a in stripes are formed. The zinc oxide films 32a and 32b are formed on the transparent-electrodes 2a and 2b to a thickness of 50 nm. The thickness of the zinc oxide films 32a and 32b are preferably 10 nm to 100 nm, more preferably 30 nm to 50 nm. When the zinc oxide films 32a and 32b is too thin, the resistance thereof becomes high, resulting in increasing the voltage for driving the LCD device 300. When the zinc oxide films 32a and 32b are too thick, the visible light transmittance of the films becomes low, resulting in lowering the display quality of the LCD device 300. In the illustrated example, the thickness of the zinc oxide films 32a and 32b was 30 nm. The transparent-electrodes 2a and 2b and the zinc oxide films 32a and 32b formed thereon are herein collectively referred to as the transparent-electrode portions. The "transparent-electrode portions" as used hereinafter includes the transparent-electrode and a transparent film formed on the top or bottom surface of the transparent-electrode which does not easily transmit light of a certain wavelength range. Such a transparent film is not necessarily electrically conductive. The transmittance of the transparent-electrode portions of this example for light with a wavelength band of 250 nm to 400 nm is 30% of the transmittance of the portions other than (outside of) the transparent-electrode portions of the substrates 1a and 1b. Though the zinc oxide films 32a and 32b were formed after the transparent-electrodes 2a and 2b in the illustrated example, they may be formed before the transparent-electrodes 2a and 2b. The zinc oxide films 32a and 32b may be formed on at least top or bottom surface of the transparent-electrodes.

The zinc oxide films 32a and 32b may be formed as follows: A solution of a compound of organozinc acid is applied to the substrates and then sintered to form a zinc oxide film. Thereafter, the zinc oxide film is patterned by a photolithographic technique such as a lift-off method so as to form the zinc oxide films only on the transparent-electrodes 2a and 2b.

Then, the electrical insulating films are formed to cover the transparent-electrodes 2a and 2b and the zinc oxide films 32a and 32b by depositing $SiO_2$ by a sputtering method, for example. The thickness of the electrical insulating films is preferably 50 nm to 300 nm, and more preferably 70 nm to 100 nm. In the illustrated example, the thickness of the electrical insulating films was 70 nm to 100 nm.

The alignment films are formed of organic material such as polyimide on the electrical insulating films. SE-150 (manufactured by Nissan Kagaku) may be used as the material. The thickness of the alignment films is preferably 30 nm to 200 nm, and more preferably 50 nm to 100 nm. The alignment films are then rubbed with nylon cloth and the like. In the illustrated example, the alignment films were rubbed so that the liquid crystal molecules in the LC region are twisted by 240° between the substrates 1a and 1b.

Then, as shown in FIG. 2A, the thus-formed pair of substrates 1a and 1b are placed so that the strip-shaped transparent-electrodes 2a and 2b oppose to and intersect at right angles each other. The substrates 1a and 1b are attached together with spacers interposed therebetween. The space between the substrates 1a and 1b is sealed by surrounding the periphery with a sealant. An opening is formed through the sealant wall as an injection port. An epoxy resin was used for the alignment films. As the spacers for controlling the cell gap, plastic beads with a diameter of 6.3 μm were used.

Thereafter, a mixture of liquid crystal material, photocurable resin, and a photopolymerization initiator is injected into the space between the substrates 1a and 1b through the injection port. In the illustrated example, a mixture of 4 g of ZLI-4427 (Merck & Co.) as the liquid crystal material added with 0.5% of a chiral agent (S-811), 0.4 g of athamantylacrylate, 0.3 g of stearylacrylate, and 0.5 g p-phenylstyrene as the photocurable resin, and 0.05 g of Irugacure 651 (Ciba-Geigy) as the photopolymerization initiator. The photopolymerization initiator may be omitted. The injection was conducted under a temperature of about 30° C. After the injection, the injection port was sealed with a commercially available UV-curable resin. The UV irradiation for curing the UV-curable resin was conducted so that the injected mixture (pixels) would not be irradiated with UV.

Then, as shown in FIG. 2A, the injected mixture is irradiated with light 8 having a wavelength of 400 nm or less (i.e., UV). As a light source, a high-pressure mercury lamp for UV irradiation which can emit collimated light was used. The intensity of irradiation was 10 $mW/cm^2$ (for light with a wavelength of 365 nm). Light was irradiated both from the side of the substrate 1a and the side of the substrate 1b simultaneously for four minutes.

The conditions of the light transmittance were not limited to those described above. The irradiation may be conducted first from the side of one of the substrates 1a and 1b and then from the side of the other substrate, or may be conducted only from one side. In the latter case, long LC regions each corresponding to a plurality of pixels in a row are formed in the shape of stripes. The irradiation may be conducted at or above the temperature at which the liquid crystal between the substrates 1a and 1b becomes isotropic liquid. When such a high temperature is used, the temperature is desirably decreased to a room temperature or lower at a speed of 0.1° to 0.5° C./min. after the irradiation.

By the irradiation as described above, the LC regions 6 are formed at the crossings of the transparent-electrodes 2a and 2b, i.e., in the pixels 12, while the polymer walls 7 are formed in the portions other than the pixels 12. As a result, the display medium layer 9 includes the LC regions 6 and the polymer walls 7 surrounding the LC regions 6. The LC cell is thus formed.

The phrase "surrounding the LC regions" as used herein includes not only the status where the LC regions 6 are completely surrounded, but also the status where a portion of the LC region 6 is not surrounded. Additional light irradiation may be conducted, if required, after the formation of the polymer walls 7 by the irradiation described above. This further ensures the curing of the photocurable resin, thereby improving the mechanical strength of the polymer walls 7. The latter irradiation is preferably conducted with weak light for a comparatively short time. Photocurable resins other than that used in this example may also be used for the material forming the polymer walls 7. The photocurable resin as used herein includes both a linearly polymerizing type (mono-functional type) and a crosslinking type (poly-functional type). Also, a type of photocurable resin which reacts both to light and heat may be used.

Polarizers (not shown) were then disposed on the surfaces of the substrates 1a and 1b of the thus-fabricated LC cell, and a phase plate (not shown) was disposed between one of the substrates 1a and 1b and the corresponding polarizer. Thus, the STN mode LCD device 300 was completed. A reflector may be disposed on one of the substrates of the LCD device 300 to obtain a reflection type LCD device.

The LCD device 300 thus fabricated was microscopically observed. As a result, it was confirmed that the LC regions 6 had been formed in the pixels 12 corresponding to the crossings of the transparent-electrodes. This was possible for the following reason: in the course of the polymerization induced phase separation of the mixture containing the liquid crystal and the photocurable resin, the pixels 12 were occupied by the liquid crystal phase because the curing of the photocurable resin is slow in the pixels 12. No cured polymer material had been formed at the interfaces of the liquid crystal and the alignment films, providing good STN mode orientation of LC molecules in the LC regions 6 by the control of the alignment films. It was also confirmed that neither the intrusion of the polymer walls 7 into the pixels 12 nor the invasion of the LC regions 6 outside the pixels 12 had been observed. In other words, the LC regions 6 had substantially the same shape and area as those of the pixels corresponding to the crossings of the transparent-electrode portions.

Since the display medium layer of the LCD device according to the present invention includes polymer walls attached to the pair of substrates facing each other, the cell gap (thickness of the display medium layer) varies little depending on a force and a shock from outside. Accordingly, the LCD device of the present invention is applicable to apparatuses vulnerable to a force and a shock from outside such as portable information terminals and pen-input type apparatuses.

(EXAMPLE 5)

In this example, the present invention is applied to an STN mode single matrix LCD device. This example is different from Example 4 in that no zinc oxide films are formed on the transparent-electrodes. The LCD device of this example has the same structure as that of the LCD device 100 of Example 1, but is different from the LCD device 100 in that the LC molecules in the LC regions 6 are aligned in the STN mode.

A method for fabricating the LCD device of this example will be described with reference to FIG. 1.

ITO was deposited on one surface of each of the substrates 1a and 1b by sputtering so as to form ITO films having a width of 280 μm and a thickness of 200 nm at intervals of 20 μm. Thus, the strip-shaped transparent-electrodes 2a and 3a are formed. The transmittance of the transparent-electrode portions of this example for light with a wavelength range of 250 nm to 400 nm is 40% of the transmittance of the portions other than (outside of) the transparent-electrode portions of the substrates 1a and 1b.

Then, electrical insulating films are formed to cover the transparent-electrodes 2a and 2b by depositing $SiO_2$ by sputtering, for example. The thickness of the electrical insulating films is preferably 50 nm to 300 nm, and more preferably 70 nm to 100 nm. In this example, the thickness of the electrical insulating films was 70 nm to 100 nm.

The alignment films are formed of organic material such as polyimide on the electrical insulating films. SE-150 (manufactured by Nissan Kagaku) may be used as the alignment films. The thickness of the alignment films is preferably 30 nm to 200 nm, and more preferably 50 nm to 100 nm. The alignment films are then rubbed with nylon cloth and the like. In the illustrated example, the alignment films were rubbed so that the liquid crystal molecules in the LC regions are twisted by 240° between the substrates 1a and 1b.

Then, as shown in FIG. 2A, the thus-formed pair of substrates 1a and 1b are placed so that the strip-shaped transparent-electrodes 2a and 2b oppose to each other and intersect each other at right angles. The substrates 1a and 1b are attached together with spacers interposed therebetween. The space between the substrates 1a and 1b is sealed by surrounding the periphery thereof with a sealant. An opening is formed through the sealant wall as an injection port. An epoxy resin was used as the sealant. As the spacers for controlling the cell gap, plastic beads with a diameter of 6.3 μm were used.

Thereafter, a mixture of liquid crystal material, photocurable resin, and a photopolymerization initiator is injected into the space between the substrates 1a and 1b through the injection port. In the illustrated example, a mixture of 4 g of ZLI-4427 (Merck & Co.) as the liquid crystal material added with 0.5% of a chiral agent (S-811), 0.4 g of athamantylacrylate, 0.3 g of stearylacrylate, and 0.5 g p-phenylstyrene as the photocurable resin, and 0.05 g of Irugacure 651 (Ciba-Geigy) as the photopolymerization initiator was prepared. The photopolymerization initiator may be omitted. The injection was conducted under a temperature of about 30° C. After the injection, the injection port was sealed with a commercially available UV-curable resin. The UV irradiation for curing the UV-curable resin was conducted so that the injected mixture (pixels) would not be irradiated with UV.

Then, as shown in FIG. 2A, the injected mixture is irradiated with light 8 having a wavelength of 400 nm or less. As a light source, a high-pressure mercury lamp for UV irradiation which can emit collimated light was used. The intensity of irradiation was 10 mW/cm$^2$ (for light with a wavelength of 365 nm). Light was irradiated both from the side of the substrate 1a and the side of the substrate 1b simultaneously for four minutes.

The conditions of the light transmittance were not limited to those described above. The irradiation may be conducted first from the side of one of the substrates 1a and 1b and then from the side of the other substrate, or may be conducted only from the side of one substrate. In the latter case, long LC regions each corresponding to a plurality of pixels in a row are formed in the shape of stripes. The irradiation may be conducted at or above the temperature at which the liquid crystal confined between the substrates 1a and 1b becomes isotropic liquid. When such a high temperature is used, the temperature is desirably decreased to a room temperature or lower at a speed of 0.1° to 0.5° C./min. after the irradiation.

Figure 2B:
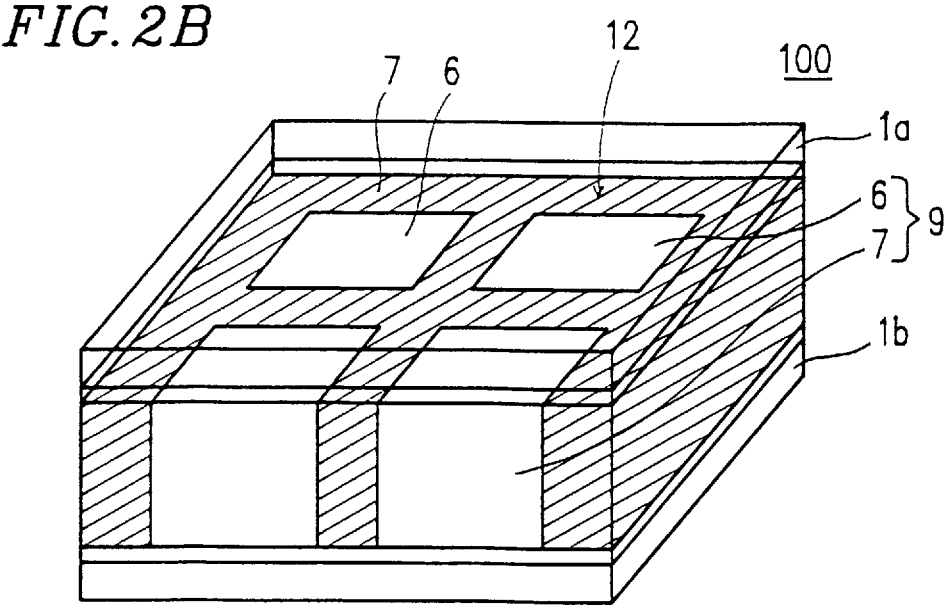

By the irradiation as described above, as shown in FIG. 2B, the LC regions 6 are formed at the crossings of the transparent-electrodes 2a and 2b, i.e., in the pixels 12, while the polymer walls 7 are formed in the portions other than the pixels 12. As a result, the display medium layer 9 includes the LC regions 6 and the polymer walls 7 surrounding the LC regions 6. The LC cell is thus formed. The polymer walls 7 may not necessarily surround the LC regions 6 completely.

Additional light irradiation may be conducted, if required, after the formation of the polymer walls 7 by the irradiation described above. This further ensures the curing of the photocurable resin, thereby improving the mechanical strength of the polymer walls 7. The latter irradiation is preferably conducted with weak light for a comparatively short time. Photocurable resins other than those used in this example may be used for the material forming the polymer walls 7.

Polarizers (not shown) were then disposed both on the side of the substrate 1a and the side of the substrate 1b of the thus-fabricated LC cell, and a phase plate (not shown) was disposed between one of the substrates 1a and 1b and the corresponding polarizer. Thus, the STN mode LCD device was completed. A reflector may be disposed on one of the substrates of the LCD device to obtain a reflection type LCD device.

The thus-fabricated LCD device was microscopically observed. As a result, it was confirmed that the LC regions 6 had been formed in the pixels 12 corresponding to the crossings of the transparent-electrodes. This is possible for the following reason; in the course of the polymerization-induced phase separation of the mixture containing the liquid crystal and the photocurable resin, the pixels 12 was occupied by the liquid crystal phase because the curing of the photocurable resin was slow in the pixels 12. No cured polymer had been formed at the interfaces of the liquid crystal and the alignment films, providing good STN mode orientation of LC molecules in the LC regions 6 under the control of the alignment films. It was also confirmed that neither the intrusion of the polymer walls 7 into the pixels 12 nor the invasion of the LC regions 6 outside the pixels 12 had been observed. In other words, the LC regions 6 had substantially the same shape and area as those of the pixels corresponding to the crossings of the transparent-electrode portions.

The display medium layer 9 of the LCD device according to the present invention includes polymer walls which are attached to the pair of substrates facing each other and thus work as a kind of spacers. Also, the polymer walls 7 are formed in a lattice shape, surrounding the pixels. Accordingly, the polymer walls 6 can effectively prevent the cell gap (thickness of the display medium layer) from varying depending on a force and a shock from outside. The structure of the polymer walls 7 surrounding the pixels is not necessarily required to obtain the above effect.

A pressure test of applying a pen pressure of 500 g/mm$\phi$ to the LCD device of this example was conducted. As a result, no disorder of the display caused by a variation in the cell thickness was observed when a pen pressure was applied. This guarantees the applicability of the LCD device of this example to pen-input apparatuses. The LCD device of this example has an excellent reliability against a force and a shock from outside other than the pen pressure. This characteristic of being highly reliable against a force and a shock from outside is not limited to the STN mode LCD device of this example, but can be obtained by other modes of LCD devices such as the TN mode and the FLC mode, and by both the single matrix type and the active matrix type LCD devices.

The present invention is applicable to various LCD devices other than those exemplified hereinbefore. By selecting the liquid crystal material for the LC regions surrounded by the polymer walls and controlling the orientation thereof, the present invention is applicable to LCD devices of various modes such as TN, STN, FLC, and ECB modes. These LCD devices may be of the active matrix type or the single matrix type. The present invention is further applicable to transmission type and reflection type LCD devices.

The material used for the substrates of the LCD devices according to the present invention is not specified. Transparent solids such as glass and plastic films transmitting light can be used. A substrate including metal and the like may be used as one of the substrates.

Thus, according to the present invention, the transparent-electrodes themselves work as a photomask, forming strong irradiation portions and weak irradiation portions selectively. Accordingly, it is not necessary to separately dispose a photomask required in the known methods. This greatly simplifies the fabrication process, and significantly improves the through-put at the fabrication. Further, by forming transparent zinc oxide films with a low transmittance for UV on the top or bottom surfaces of the transparent-electrodes, the UV transmittance of the transparent-electrode portions effectively lowers. This clearly separates the LC regions and the polymer regions. Moreover, since the transparent-electrode portions working as a photomask is incorporated in the LC cell, no alignment of the photomask with the LC cell is required at the light irradiation. Accordingly, compared with the known methods including disposing a photomask on the outer surface of a substrate of an LCD device, the alignment precision at the light irradiation markedly increases, and thus the productivity greatly improves.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a pair of substrates interposing a display medium including a polymer and liquid crystal therebetween and transparent-electrode portions formed on at least one of the pair of substrates, the transparent-electrode portions transmitting less light than at least one of the pair of substrates within a certain wavelength range, wherein the liquid crystal display device further has one of the following two structures:

the transparent-electrode portions are formed on both the pair of substrates in a shape of strips, the pair of substrates are placed to face each other such that the strip-shaped transparent-electrode portions on the pair of substrates intersect each other, and crossings of the transparent-electrode portions constitute pixels, and a polymer wall is formed along at least a portion of peripheries of the pixels; or the transparent-electrode portions are formed on both the pair of substrates, the transparent-electrode portions on one of the pair of substrates constitute pixel electrodes arranged in a matrix, while the transparent-electrode portions on the other substrate include thickened portions facing the pixel electrodes and thinned portions, and portions corresponding to the pixel electrodes constitute pixels, and a polymer wall is formed along at least a portion of peripheries of the pixels.

2. A liquid crystal display device according to claim 1, wherein the transparent-electrode portions are formed on both the pair of substrates in a shape of strips, the pair of substrates are placed to face each other such that the strip-shaped transparent-electrode portions on the pair of substrates intersect each other, and crossings of the transparent-electrode portions constitute pixels.

3. A liquid crystal display device according to claim 1, wherein the transparent-electrode portions are formed on both the pair of substrates, the transparent-electrode portions on one of the pair of substrates constitute pixel electrodes arranged in a matrix, while the transparent-electrode portions on the other substrate include thickened portions facing the pixel electrodes and thinned portions, and portions corresponding to the pixel electrodes constitute pixels.

4. A liquid crystal display device according to claim 1, wherein the at least one of the pair of substrates is transparent, and the light transmittance for light with a wavelength of 400 nm or less of the transparent-electrode portions is 60% or less than that of the at least one of the pair of substrates.

5. A liquid crystal display device according to claim 1, wherein the transparent-electrode portions include ITO films.

6. A liquid crystal display device according to claim 5, wherein the ITO films contain 7 wt % or more of tin oxide.

7. A liquid crystal display device according to claim 1, wherein the transparent-electrode portions include antimony-doped tin oxide films.

8. A liquid crystal display device according to claim 1, wherein alignment films are formed on a surface of at least one of the pair of electrodes facing the display medium.

9. A liquid crystal display device according to claim 1, wherein the transparent-electrode portions include zinc oxide films.

10. A liquid crystal display device according to claim 5, wherein the transparent-electrode portions further include zinc oxide films.

11. A liquid crystal display device according to claim 7, wherein the transparent-electrode portions further include zinc oxide films.

12. A liquid crystal display device according to claim 2, wherein the display medium includes liquid crystal regions formed corresponding to the pixels and polymer walls surrounding the liquid crystal regions.

13. A liquid crystal display device according to claim 3, wherein the display medium includes liquid crystal regions formed corresponding to the pixels and polymer walls surrounding the liquid crystal regions.

* * * * *